Oct. 3, 1933.                     H. T. PARKER                    1,929,190
                            QUICK DETACHABLE COUPLING
                              Filed Jan. 3, 1933
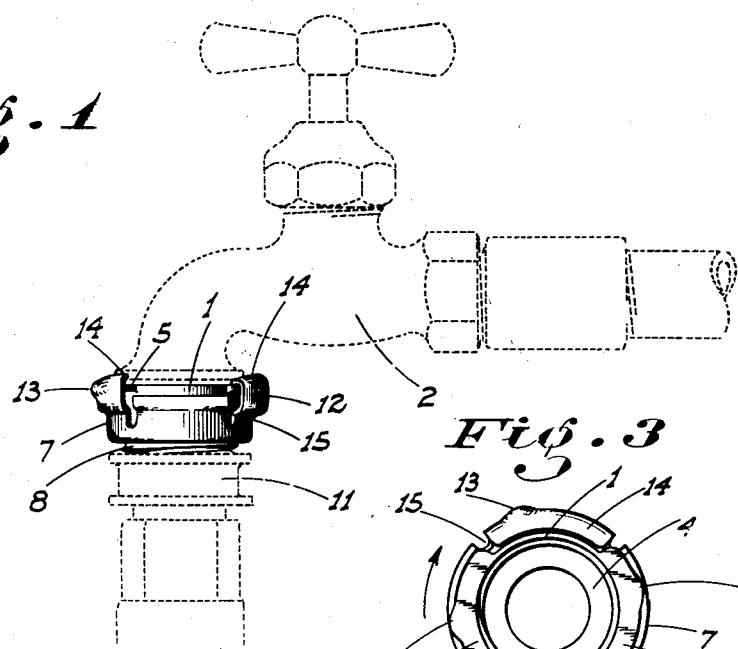
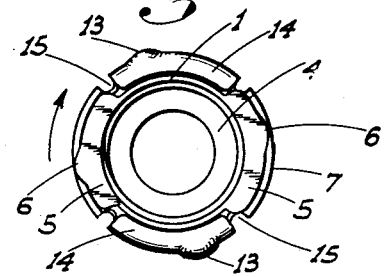
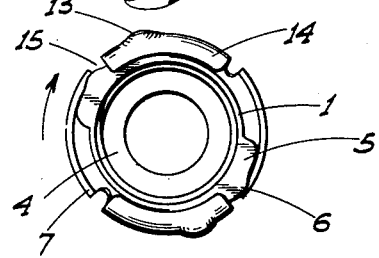
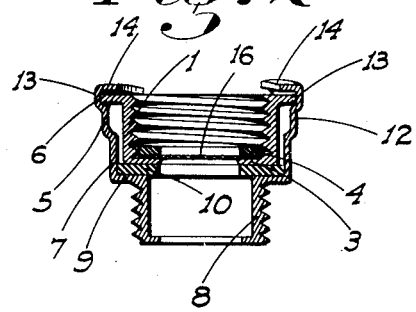
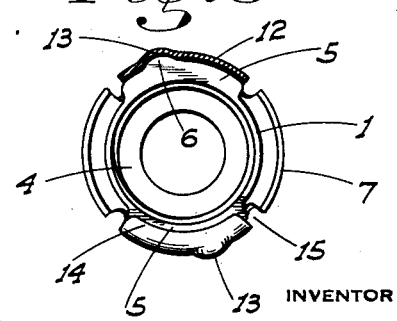
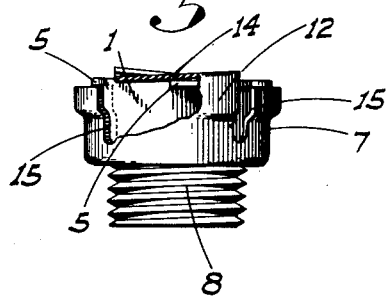
INVENTOR
*Harry T. Parker*
BY
ATTORNEY Patented Oct. 3, 1933

1,929,190

UNITED STATES PATENT OFFICE 1,929,190

QUICK DETACHABLE COUPLING

Harry T. Parker, Oakland, Calif., assignor to Ry-Lock Company, Ltd., San Leandro, Calif., a corporation of Nevada Application January 3, 1933. Serial No. 649,778

8 Claims. (Cl. 285—175)

This invention relates to quick detachable hose couplings usable between a hose and a hydrant or between adjacent sections of hose to expedite the coupling or uncoupling of the parts.

The principal objects of my invention are to provide a coupling of this character in which a positive lock and one which will not loosen up or deteriorate with use is had between the parts of the coupling when they are properly placed together; one which may be made entirely of pressed brass or similar metal so that the coupling may be made and sold very cheaply; one which requires no new method of attachment over that used in connection with the ordinary threaded coupling; one which uses standard washers to form the necessary watertight joint; and one which by replacing the washers when necessary will continue to give good service indefinitely.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Fig. 1 is a side elevation of the coupling as connected to a hose and hydrant.

Fig. 2 is a sectional elevation of the coupling detached and in its locked position.

Fig. 3 is a top plan view of the coupling showing the male thimble in its initial position in the female cup.

Fig. 4 is a similar view showing the thimble partially turned toward a locking position.

Fig. 5 is a similar view showing the thimble turned to a fully locked position.

Fig. 6 is a side elevation of the coupling with the female member partly broken out showing the thimble in the position corresponding to Fig. 4.

Referring now more particularly to the characters of reference on the drawing, the male member comprises a cylindrical tapped thimble 1 adapted to be screwed onto a hydrant valve 2 or onto the male element of an ordinary screw coupling. This thimble is provided at the bottom with a seat 3 for a standard rubber washer 4 by which a watertight connection with the end of the hydrant is made.

This thimble is formed with opposed flat radially projecting flanges 5 which extend part way about the thimble at its outer end, the arcuate length of each flange being less than 90°. The outer edges of the flanges are concentric with the thimble except where they are formed with diametrally opposed swells or nubs 6, which are preferably nearer the following than the leading ends of the flanges relative to the direction of coupling rotation of the member as plainly shown in Fig. 3.

The female member of the coupling to correspond with the thimble comprises an upper cylindrical cup portion 7 substantially as deep as the thimble 1 and whose lower internal diameter is slightly greater than that of the thimble so as to locate the same in place without undue play and yet without binding. The lower portion 8 of the female member, below the cup portion 7, is smaller in diameter than the latter, forming a flat shoulder 9 therewith. This forms a seat for a rubber washer 10 which is closely engaged and somewhat compressed by the under surface or base of the thimble 1 when the latter is locked in place in the cup. The portion 8 is externally threaded to engage the usual female coupling member 11 of a hose as indicated in Fig. 1.

Opposed circumferential extensions 12 project upwardly from the portion 8 and are of somewhat larger diameter or so as to closely receive the flanges 5 therebetween. The arcuate length of these extensions is substantially the same as that of said flanges or so that the spaces therebetween are of sufficient extent to initially receive said flanges from above. Said extensions are formed with diametrally opposed recesses 13 to receive the nubs 6 when the flanges 5 are turned so as to aline with the extensions 12, and are consequently disposed in the length of the extensions in the proper positions relative to those of the nubs on the flanges 5.

Said extensions are also formed for their full length with overhanging flanges 14. These are set on a pitch or slope relative to the axis of the coupling at such a height from the shoulder 9 and relative to the height of the thimble 1 and the washer 10, that the upper surfaces of the flanges 5 at their leading ends will only engage the under surfaces of the flanges 14 when said flanges 5 have been turned under the flanges 14 a considerable distance as shown in Fig. 6. When the corresponding flanges start to engage as above stated the corresponding nubs and recesses are still disengaged, as shown in Fig. 4.

In operation with the parts of the coupling attached to a hydrant and hose, they are initially brought together by placing the thimble 1 into the cup 7 so that it bears against the washer 10 and with the flanges 5 initially located between the extensions 12 and flanges 14. Upon then turning one member relative to the other in a right hand direction the flanges 5 pass under the flanges 14, the initial portions of which form guides and locating means for the flanges 5 and hold the parts of the coupling against accidentally falling apart.

When the flanges 5 finally bite against the downwardly sloping flanges 14, further relative rotation of the parts forces the thimble 1 down into the cup 7, compressing the washer 10 and making a watertight seal therewith. At the same time the hubs 6 engage the walls of the extensions 12 and spread the same apart until said nubs reach the recesses 13, into which they spring thus releasing said walls. The spreading of the walls is permitted both by reason of the fact that the coupling is made of pressed brass which is a resilient metal and on account of the fact that the cup 7 is longitudinally slit as at 15 at the ends of the extensions 12. In this manner the nubs when once seated in the recesses are restrained from leaving the same by the extensions 12 which spring in or back to their normal positions after having been once spread by the nubs.

Once the members have been turned to the proper locking position, which may be readily felt by the operator when the nubs engage the recesses, the parts are firmly yet yieldably held against retractive movement while at the same time compressively engaging the washer 10 to form the necessary water-tight seal. The parts of the coupling are of course disconnected by a relative reversal of rotative movement or until the flanges 5 are again moved in the clear of the flanges 14.

As stated, the flanges 5 only frictionally engage the flanges 14 toward the following ends of the latter. This allows the entering end portions of the walls 12 perfect freedom of spring action, so that they are free of all washer compressing friction or resistance. The return of the walls 12 to their normal or nonexpanded position after being engaged by the hubs 6 is therefore made positive. If the wall flanges 14 were tightly engaged by the cup flanges 5 at this end, such free floating action of the side walls could not be had.

If desired, a disc of fine screen as at 16 in Fig. 2, may be inserted in the thimble under the washer so that the thimble may be used on the faucet alone to serve as an antisplash device.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention as defined by the appended claims.

Having thus described my invention what I claim as new and useful and desire to secure by Letters Patent is:

1. A quick action hose coupling comprising a male thimble, opposed segmental flanges projecting radially from the outer end of the same, a female cup to turnably receive the thimble, washer engaging surfaces formed on the parts at their adjacent ends whereby when said surfaces are forced toward each other a washer disposed therebetween will be compressed to form a watertight joint, and opposed segmental flanges on the cup to overhang the thimble flanges and of such arcuate length that said thimble flanges may be initially positioned therebetween; one set of said flanges being set on a pitch relative to the axis of the coupling and being disposed relative to an initial washer engaging position of the thimble so that the leading ends of one set of flanges will engage the other flanges intermediate their ends only after the parts have been relatively rotated a certain distance from said initial position and so that a further rotation will cause the thimble to be forced inwardly of the cup to compress the washer.

2. A quick action hose coupling comprising a male thimble, opposed segmental flanges projecting radially from the outer end of the same, a female cup to turnably receive the thimble, washer engaging surfaces formed on the parts at their adjacent ends whereby when said surfaces are forced toward each other a washer disposed therebetween will be compressed to form a watertight joint, means on the cup to engage the flanges and cause said surfaces to be thus forced toward each other with a relative rotation of the parts in one direction, and means between the parts and functioning automatically when the parts have been thus rotated to yieldably lock them against retractive rotation.

3. A quick action hose coupling comprising a male thimble, opposed segmental flanges projecting radially from the outer end of the same, a female cup to turnably receive the thimble, washer engaging surfaces formed on the parts at their adjacent ends whereby when said surfaces are forced toward each other a washer disposed therebetween will be compressed to form a watertight joint, means on the cup to engage the flanges and cause said surfaces to be thus forced toward each other with a relative rotation of the parts in one direction, nubs formed on and projecting from the periphery of the flanges, and opposed segmental side-wall extensions on the cup spaced apart a distance less than that between the points of the nubs and disposed to be engaged and spread by said nubs with the relative rotation of the parts; said extensions having recesses in which the nubs are received when said parts have rotated to a washer compressing position.

4. A device as in claim 3, in which the cup is made of resilient material and is slit longitudinally for a certain distance at the ends of the extensions to facilitate the outward spreading movement thereof.

5. A quick action hose coupling comprising a male thimble, a female cup to turnably receive the thimble, washer engaging surfaces formed on the cup and thimble at their adjacent ends whereby when said surfaces are forced toward each other a washer disposed therebetween will be compressed to form a watertight joint, and sets of opposed segmental flanges on the outer ends of the cup and thimble adapted to cooperate with the relative turning of the parts in one direction from an initial separable position to first prevent separation of said parts and finally cause the washer engaging surfaces thereof to be forced toward each other.

6. A device as in claim 5, with means formed with said flanges and functioning when the parts are turned to a washer compressing position to yieldably lock the same against retractive rotation.

7. A quick action hose coupling comprising a male thimble, a female cup to turnably receive the thimble, washer engaging surfaces formed on the cup and thimble at their adjacent ends whereby when said surfaces are forced toward each other a washer disposed therebetween will be compressed to form a watertight joint, opposed segmental flanges projecting laterally from the outer end of the thimble, opposed flanges on the cup to overhang the thimble flanges and of such arcuate length relative thereto as to enable the thimble to be initially moved axially into the female cup with the flanges thereof in the spaces between the cup flanges; the cup flanges having a screw-pitch or helix-angle relative to the axis of the coupling and being disposed so as to engage the adjacent surface of the thimble flanges at their leading edges only after the cup has been relatively turned a certain distance from its initial position to force the thimble inwardly of the cup with a further relative rotation of the latter.

8. A quick action hose coupling comprising male and female members, washer engaging surfaces formed on the members at their adjacent ends, whereby when said surfaces are forced toward each other a washer disposed therebetween will be compressed, means between the members to thus move such ends toward each other with the relative rotation of said members, and additional means between said members to yieldably hold the members against retractive rotation after a washer is thus compressed and without any lessening of the compressive pressure.

HARRY T. PARKER.